US008154428B2

(12) United States Patent  (10) Patent No.: US 8,154,428 B2
Do et al.  (45) Date of Patent: Apr. 10, 2012

(54) GESTURE RECOGNITION CONTROL OF ELECTRONIC DEVICES USING A MULTI-TOUCH DEVICE

(75) Inventors: Lydia M. Do, Raleigh, NC (US); Travis M. Grigsby, Austin, TX (US); Pamela A Nesbitt, Tampa, FL (US); Lisa A. Seacat, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 938 days.

(21) Appl. No.: 12/173,349

(22) Filed: Jul. 15, 2008

(65) Prior Publication Data

US 2010/0013676 A1    Jan. 21, 2010

(51) Int. Cl.
*H03K 17/94* (2006.01)
*G06F 7/04* (2006.01)
*G06F 3/041* (2006.01)

(52) U.S. Cl. .............................. 341/20; 340/5.8; 345/173
(58) Field of Classification Search .................... 341/20; 340/5.8; 345/173
See application file for complete search history.

(56) References Cited

U.S. PATENT DOCUMENTS

| 6,408,087 | B1 | 6/2002 | Kramer |
| 6,501,515 | B1 | 12/2002 | Iwamura |
| 2003/0095154 | A1 | 5/2003 | Colmenarez |
| 2003/0227439 | A1* | 12/2003 | Lee et al. ........................ 345/156 |
| 2006/0074923 | A1* | 4/2006 | Gower et al. .................. 707/100 |
| 2006/0256090 | A1 | 11/2006 | Huppi |
| 2007/0130582 | A1 | 6/2007 | Chang et al. |
| 2009/0219253 | A1* | 9/2009 | Izadi et al. ..................... 345/173 |

OTHER PUBLICATIONS

Izadi, S.; Agarwal, A.; Criminsi, A.; Winn, J.; Blake, A.; Fitzgibbon, A.;, "C-Slate: A Multi-Touch and Object Recognition System for Remote Collaboration using Horizontal Surfaces," Horizontal Interactive Human-Computer Systems, 2007. TABLETOP '07. Second Annual IEEE International Workshop on , vol., No., pp. 3-10, Oct. 10-12, 2007.*
"Microsoft Surface", http://blogs.msdn.com/text/archive/2007/05/30/microsoft-surface.aspx, May 30, 2007, 3 pages.
"Tales from the Microsoft Surface team", SDK Introduction, http://blogs.msdn.com/surface/archive/2007/11/05/sdk-introduction.aspx, Nov. 5, 2007, 3 pages.
"Remote Control for Zoomable UI on TV", http://www.ip.com/pubview/IPCOM000159392D, Oct. 29, 2007, 6 pages.

* cited by examiner

*Primary Examiner* — Jared Fureman
*Assistant Examiner* — Scott Bauer
(74) *Attorney, Agent, or Firm* — Francis Lammes; Stephen J. Walder, Jr.; Jeffrey S. LaBaw (57) ABSTRACT

Controlling external electronic devices using presence recognition through a multi-touch device is provided. An indication of the presence of at least one of an object or a gesture on a surface of the multi-touch device is received. A plurality of characteristics associated with the object or gesture are identified. Using the plurality of physical characteristics, a data structure is searched to determine the existence of a single object or a single gesture with characteristics that matches the plurality of characteristics. Responsive to a match, a determination is made as to whether the single object or the single gesture has an associated function. Responsive to the existence of the associated function, the associated function is executed on one of a plurality of external electronic devices.

17 Claims, 5 Drawing Sheets

GESTURE RECOGNITION CONTROL OF ELECTRONIC DEVICES USING A MULTI-TOUCH DEVICE

BACKGROUND OF THE INVENTION

1. Field of the Invention

The present application relates generally to an improved data processing system and method. More specifically, the present application is directed to using presence recognition through a multi-touch device to control external electronic devices.

2. Background of the Invention

Many, if not all, home entertainment electronic devices are controlled through the use of remote controls. Users use these remote controls to get the electronic devices to perform a function that is programmed within the electronic device, such as power on/off, volume up/down, channel up/down, access guides/menus, etc. While some remote controls are designed to control a single electronic device, other remote controls, commonly referred to as universal remotes, are designed to control multiple electronic devices. These universal remotes use single and/or a combination of keypad or touch screen inputs to interact with the electronic devices to perform the desired function. However, known remote control devices fail to combine gesture recognition with the control of the electronic devices.

BRIEF SUMMARY OF THE INVENTION

The illustrative embodiments provide mechanisms for presence recognition through a multi-touch device to control external electronic devices. The illustrative embodiments receive an indication of the presence of at least one of an object or a gesture on a surface of the multi-touch device. The illustrative embodiments identify a plurality of characteristics associated with the object or gesture. Using the plurality of physical characteristics, the illustrative embodiments search a data structure to determine the existence of a single object or a single gesture with characteristics that matches the plurality of characteristics. The illustrative embodiments determine if the single object or the single gesture has an associated function in response to a match. The illustrative embodiments execute the associated function on one of a plurality of external electronic devices in response to the existence of the associated function.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the exemplary embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE INVENTION

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
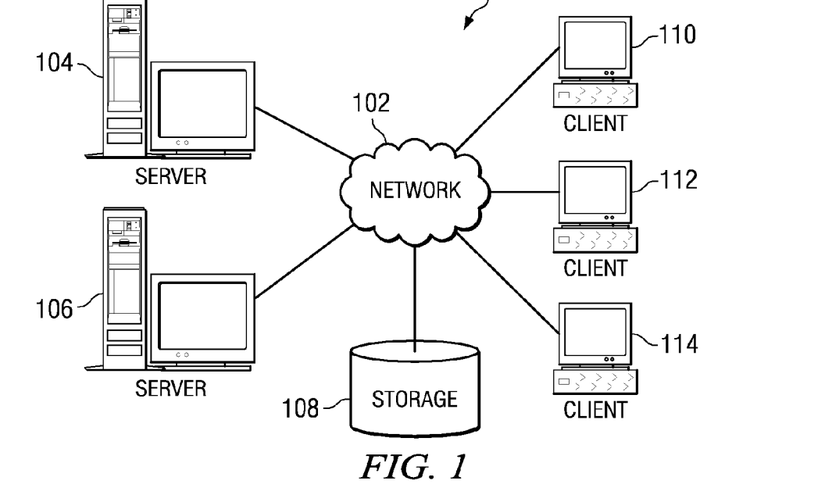
FIG. 1 is an exemplary representation of an exemplary distributed data processing system in which aspects of the illustrative embodiments may be implemented.
Figure 2:
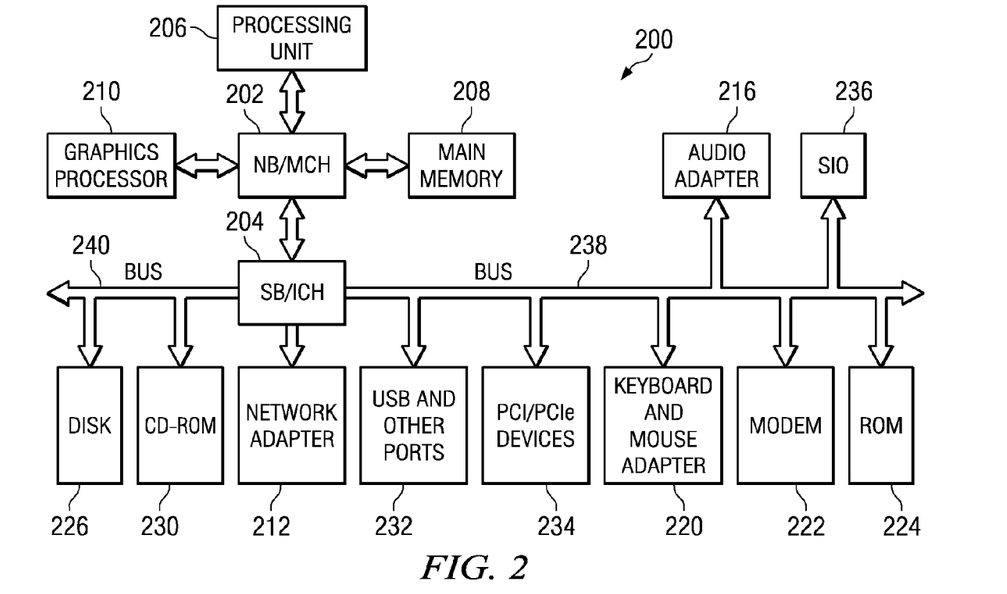
FIG. 2 is a block diagram of an exemplary data processing system in which aspects of the illustrative embodiments may be implemented.

The illustrative embodiments provide mechanisms for using presence recognition through a multi-touch device to control external electronic devices. As such, the mechanisms of the illustrative embodiments are especially well suited for implementation within a stand alone data processing device or a distributed data processing environment and within, or in association with, data processing devices, such as servers, client devices, and the like. While the mechanisms of the illustrative embodiments may be implemented in a stand alone device or a distributed data processing environment, the following description is directed to the distributed data processing environment for illustration purposes. In order to provide a context for the description of the mechanisms of the illustrative embodiments, FIGS. 1-2 are provided hereafter as examples of a distributed data processing system, or environment, and a data processing device, in which, or with which, the mechanisms of the illustrative embodiments may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as host 110 in FIG. 1, in which computer usable code or instructions implementing the processes for illustrative embodiments of the present invention may be located.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

The preferred embodiment is implemented in, or in association with, a surface such as Surface™ from Microsoft Corporation. Surface™ is essentially a Windows Vista® PC tucked inside a black table base, topped with a 30-inch touchscreen in a clear acrylic frame. Five cameras that can sense nearby objects are mounted beneath the screen. Users can interact with the machine by touching or dragging their fingertips and objects such as paintbrushes across the screen. In addition to recognizing finger movements, Surface™ may also identify real-world items tagged with special barcode labels. For example, when a diner sets down a wine glass tagged with a special barcode, the Surface™ may automatically offer additional wine choices tailored to the dinner being eaten.

The four main components being important in the Surface™ interface are direct interaction, multi-touch contact, a multi-user experience, and object recognition via a special barcode. The device also enables drag and drop digital media when wi-fi enabled devices are placed on its surface such as a Microsoft Zune™, cellular phones, or digital cameras. The Surface™ technology allows non-digital objects to be used as input devices. In one example, a normal paint brush was used to create a digital painting in the software. Using cameras for vision makes it possible for Surface™ to not rely on restrictive properties required of conventional touchscreen or touchpad devices such as the capacitance, electrical resistance, or temperature of the tool used. The Surface™ "vision" is created by a near-infrared, 850-nanometer-wavelength LED light source aimed at the surface. When an object touches the tabletop, the light is reflected to multiple infrared cameras with a net resolution of 1280×960, allowing it to sense, and react to items touching the tabletop.

However, one of ordinary skill in the art would appreciate that the data processing system 200 may take the form of any of a number of different data processing systems including client computing devices, server computing devices, a tablet computer, laptop computer, telephone or other communication device, or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

While Surface™ is capable of identifying objects placed on and gestures made on the surface, the objects and gestures that are recognized by Surface™ only interact with the Windows Vista® PC tucked inside a black table base. The illustrative embodiments provide mechanisms for using presence recognition through a multi-touch device to control external electronic devices. By programming the multi-touch device with the control information of the various external electronic devices and by using presence recognition to identify objects with or without an identification tag that are placed on a multi-touch device or identify gestures made on the multi-touch device, the external electronic devices are controlled, interacted with, and/or programmed. Using identifying gestures and/or characteristics of objects, such as geometric shape, characteristic markings, or the like, the gesture and/or object may be directly or indirectly identified. Once gestures and/or objects are identified, an external audio, video, or combination of audio and video electronic devices may be controlled.

Figure 3:
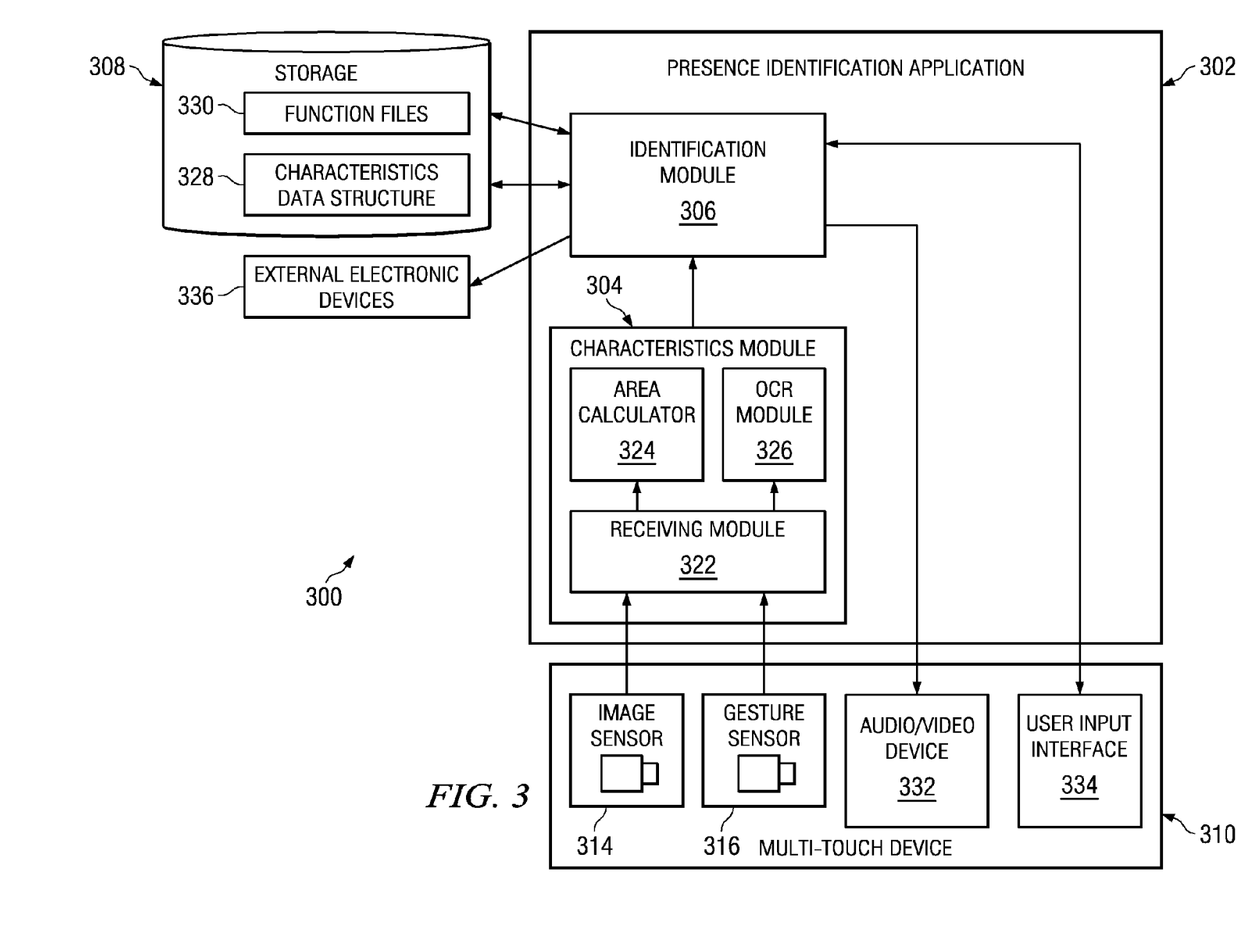
FIG. 3 depicts an exemplary functional block diagram of an object recognition system in accordance with an illustrative embodiment.

FIG. 3 depicts an exemplary functional block diagram of a presence recognition system in accordance with an illustrative embodiment. Presence recognition system 300 includes presence identification application 302, which is an application that may be executed by a processing unit such as processing unit 206 of FIG. 2, multi-touch device 310, and storage 308. Presence identification application 302, multi-touch device 310, and storage 308 may be located on a client device or presence identification application 302 may reside within a server, such as server 104 of FIG. 1, and communicate to multi-touch device 310, which is associated with the client device such as client 110 of FIG. 1, and storage 308 through a network, such as network 102 of FIG. 1.

Presence identification application 302 may comprise characteristics module 304 and identification module 306. Multi-touch device 310 may comprise a clear surface that is part of a structure such that various sensors are located beneath multi-touch device 310, a solid surface with various sensors above multi-touch device 310, or any structure where sensors can determine physical characteristics, hereafter referred to as characteristics, associated with an object that is placed on multi-touch device 310 or gestures that are made on multi-touch device 310. Multi-touch device 310 may comprise a surface, such as Surface™ from Microsoft Corporation, although the illustrative embodiments recognize that presence identification application 302 may be implemented using any type of multi-touch device that is capable of identifying characteristics associated with gestures that are drawn/written on or objects that are placed on multi-touch device 310.

In this example, once a gesture has been written or drawn on multi-touch device 310 or an object has been placed on multi-touch device 310, image sensor 314 may determine characteristics associated with an object that is placed on or a gesture that is drawn/written on multi-touch device 310 and gesture sensor 316 may determine characteristics associated with a gesture that is written/drawn on multi-touch device 310. The illustrative embodiments recognize that image sensor 314 may be able to sense when an object has been placed on multi-touch device 310. In addition, the illustrative embodiments also recognize that once a gesture that is a figure has been drawn or written on multi-touch device 310, image sensor 314 may also be able to capture an image of the drawing as an object. For example, if a user draws a basketball hoop and net on multi-touch device 310, then image sensor 314 may be able to capture the drawing. However, for those gestures that are not distinguishable as a drawing of an object, such as when a user taps on a specific portion of multi-touch device 310 which may be associated with a volume control, channel control, or the like and then the user makes an upward motion in order to increase the volume, change the channel, or the like, then gesture sensor 316 is used to identify the characteristics associated with those kinds of gestures. Furthermore, while this example depicts image sensor 314 and gesture sensor 316, other sensors may be used to determine the characteristics of a gesture or object interacting with multi-touch device 310. Additionally, while image sensor 314 and gesture sensor 316 are illustrated as individual sensors, the illustrative embodiment recognize that multiple sensors may be implemented so that multiple images may be used to increase the accuracy in detecting changes imposed on or applied to multi-touch device 310.

Image sensor 314 and gesture sensor 316 may each be a camera, group of cameras, or other imaged detection device, that records gestures that are drawn or written on or objects that are placed on multi-touch device 310. For example, if multi-touch device 310 comprises a clear surface, then image sensor 314 and gesture sensor 316 may be placed under the clear surface. When a gesture is drawn or written on multi-touch device 310, then gesture sensor 316 and/or image sensor 314 may capture characteristics associated with the gesture and send the characteristics to receiving module 322. Likewise, if an object is placed on multi-touch device 310, then image sensor 314 may capture an image of the object and send the image to receiving module 322. Once receiving module 322 receives the image and/or characteristics, the image may be sent to area calculator 324, optical character recognition (OCR) module 326, and/or identification module 306 either through direct connection or via one or more data networks.

For an object that is placed on or for a gesture that is captured as an image of an object on multi-touch device 310, area calculator 324 may first determine a geometric shape of the object so that an area associated with the object may be calculated. In determining the geometric shape of the object, area calculator 324 may identify the outer boundaries of the object and then divide the shape of the object into multiple geometric shapes in order to calculate an accurate area. For example, if a pencil where placed upon multi-touch device 310, area calculator 324 may divide the shape of the object into a rectangle for the length of the pencil and a triangle for the tip of the pencil in order to calculate the correct area. Once area calculator 324 determines the geometric shape or shapes associated with the object, area calculator 324 may calculate the area associated with the object recorded in the image received from receiving module 322. Area calculator 324 may use predetermined distances associated with the size of the image recorded by image sensor 314 to determine the area associated with an object placed on multi-touch device 310. For example, if a glass is placed on multi-touch device 310, then area calculator 324 may be able to determine the diameter of the bottom of the glass. Using the diameter, area calculator 324 would be able to determine the area of the bottom of the glass using $A=\pi(d/2)^2$. Area calculator 324 may then send the calculated area value and geometric shape(s) to identification module 306 either through direct connection or via one or more data networks. In addition to, or in lieu of, detecting the area of the object, the illustrative embodiments recognize that dimensions, such as width, radius, length, etc. of the object may also be identified and sent to identification module 306.

OCR module 326 may analyze the image received from receiving module 322 and perform optical character recognition of the object and/or words associated with a gesture in the image to obtain any characteristic markings that would aid in identifying the object or gesture. For example, if a polystyrene cup is placed on multi-touch device 310, then OCR module 326 may be able to identify manufacturer markings, model number marking, and recyclable indicators or if a user writes the word "football" on multi-touch device 310, then OCR module 326 may be able to translate the image of the captured word. OCR module 326 then sends identified information to identification module 306 either through direct connection or via one or more data networks.

Thus, identification module 306 receives one or more characteristics associated with an image of the object placed on or for a gesture that is captured as an image of an object on multi-touch device 310. Identification module 306 may receive for the object or gesture, an area value, geometric shape(s), identification information, text identification, an image, or the like. Identification module 306 may use all or a portion of the characteristics for the object or gesture to identify the object or gesture based on similar characteristics for objects and gestures stored in characteristics data structure 328 on storage 308. Identification module 306 compares the characteristic information received from receiving module 322, area calculator 324, and/or OCR module 326, to characteristic information for objects and gestures that are stored in characteristics data structure 328 which may be a file, database, or the like of recognizable objects and their associated characteristics.

In comparing the characteristic for the gesture or object on multi-touch device 310 to the characteristics for objects stored in characteristics data structure 328, identification module 306 may successively match each of the characteristics that are received to the object characteristics in characteristics data structure 328 and limit the number of identified items based on matches to each characteristic. For example, if an object is placed on multi-touch device 310, then identification module 306 may receive characteristics, such as a geometric shape of a circle, an area of 3.925 inches, and characteristic markings, such as a manufacturer, module number, and recycle symbol. Identification module 306 may then search characteristics data structure 328 to identify all items with a geometric shape of a circle. Once those items are identified, identification module 306 may limit the identified items by area, and then by characteristic marking, each time limiting the number of identified items until hopefully only one item is matched. Items identified by area may be made within some predetermined tolerance. While this example indicates that identification module 306 identifies in a particular order, the illustrative embodiments recognize that characteristics data structure 328 may be searched in any order.

If there is an exact match in the compared characteristics or if the characteristics are met within some predetermined tolerance, then identification module 306 may determine if there is an associated function that may be performed in relation with one or more external electronic devices 336 in function files 330 on storage 308 that is associated with the identified object and/or gesture. Associated functions in function files 330 may be volume up/down, mute, channel up/down, display guide, display limited guide, or the like. In displaying the limited guide, the selection of the listings presented in the limited guide may be limited based on the gestures drawn/written on and or objects placed on multi-touch device 310. The user may program one or more functions to be perform is a particular object and/or gesture is placed, written, or drawn on multi-touch device 310. Likewise, if a new object is placed on or a new gesture is written or drawn on multi-touch device 310, then identification module 306 may prompt the user through audio/video device 332 to determine if the user wants to associate one or more functions with the object and/or gesture. Identification module 306 may present a list to the user using audio/video device 332 of all functions that are associated with all of the external electronic devices for which identification module 306 is programmed.

For example, if OCR module 326 identifies characteristic markings, such as the front cover of an Every Day with Rachel Ray™ magazine or a back cover of the same magazine using a barcode associated with the magazine placed on multi-touch device 310, then identification module 306 may match the identified barcode or front cover to images located in characteristics data structure 328. Identification module 306 may then identify shows that star Rachel Ray, such as "30 Minute Meals™," "$40 a Day™," "The Rachel Ray Show™", or the like, that are listed in the television guide and display the limited guide to the user indicating that one or more of these shows is or will be playing soon.

As another example, if identification module 306 identifies a gesture, such as a basketball or hoop that is drawn on the multi-touch device, then identification module 306 may match the identified gestures to images located in characteristics data structure 328. Identification module 306 may then identify all basketball games that are listed in the television guide and display the limited guide to the user indicating one or more basketball games that are or will be playing soon. The limited guide may be presented to the user on multi-touch device 310, on a video display of external electronic devices 336, or both, based on user preferences. Furthermore, preferences may be set with regard to which items are displayed. That is, the user may prefer to see sports information, but not cooking show information.

In a further embodiment, if identification module 306 is not able to match any characteristics received for the image to the characteristics for an image in characteristics data structure 328 or if identification module 306 matches the characteristics received for the image to the characteristics to more than one image in characteristics data structure 328, then identification module 306 may prompt the user to identify the object and/or gesture or present the user with a list of possible choices for the gesture and/or object. For example, if a canned beverage and a bag of chips are placed on multi-touch device 310, then while the chips may be readily identifiable, the canned beverage may be an alcoholic beverage or a carbonated beverage. Thus, identification module 306 may be unable to determine whether to display sport shows or children shows.

Therefore, identification module 306 may prompt the user using audio/video device 332 with a list of possible objects and/or gestures. The user may select from the list in order to identify the object(s) and/or gesture(s) using user input interface 334. However, if the object or gesture is not on the list presented to the user using audio/video device 332, the user may provide the identification of the object or gesture using user input interface 334. The user may provide the input through, for example, a keyboard that is displayed on multi-touch device 310. Once the user identifies the object(s) and or gesture(s), identification module 306 may determine if a function is to be performed associated with the object or gesture on multi-touch device 310.

If the user does not identify the object or gesture, then identification module 306 may stop the current operation. If an object or gesture with the same or similar characteristics is encountered at a later time, then identification module 306 may prompt the user using audio/video device 332 indicating that the last time this object or gesture was encountered no identification was provided. At this point the user may identify the object or gesture or fail once again to identify the object or gesture. If the user once again fails to identify the object or gesture, identification module 306 may cease to prompt the user the next time the object or gesture is encountered, for the next predetermined amount of times the object or gesture is encountered, until the presence identification application 302 is reinitialized, some predetermined time period, or the like.

In another embodiment, a group of objects or gestures may be placed on multi-touch device 310 at the same time and identification module 306 may identify one object or gesture based on the identification of another object or gesture in the group of objects or gestures using a category field in characteristics data structure 328. For example, if a backpack, textbooks, and pencils are placed on the multi-touch device 310, then while identification module 306 may be able to identify the textbooks and pencils, identification module 306 may not be able to readily identify the backpack. However, based on the identification of the textbooks and the pencil, identification module 306 may identify the group category as "school equipment" and narrow down the identification of the backpack. Then, identification module 306 would use the associated characteristics to identify the as yet unidentified backpack. For example, identification module 306 may receive characteristics associated with the unidentified object, such as a geometric shape of a rectangle, an area of 216 inches, and a manufacturers marking. Identification module 306 may then search only objects with a category of school items in characteristics data structure 328 to identify all items with a geometric shape of a rectangle. Once those items are identified, identification module 306 may limit the identified items by area, and then by manufacturer each time limiting the number of identified items until hopefully identification module 306 identifies a backpack. Once the items are identified, then identification module 306 may search function files 330 to determine if a function should be associated with these items, such as turning the television off.

Further examples, of functions that may be performed based on gestures or objects placed on multi-touch device 310 may be:

Muting the television and/or stereo, if the user writes the word "Mute" on multi-touch device 310.

Playing "Baby Einstein™" music on a stereo if a baby places a pacifier on multi-touch device 310.

Playing a selected CD based on a preprogrammed keyword being written on multi-touch device 310.

Increase the volume if a user taps on a predefined portion of multi-touch device 310 and then makes an upward motion on multi-touch device 310.

The illustrative embodiments may also interact with other electronic devices, such as a PDA, cell phone, or the like. For example, if a user places their PDA on multi-touch device 310, then based on the identification of the PDA, identification module 306 may start a synchronization process with the PDA from the user's home computer using a wireless network, such as Bluetooth, WiFi, or the like.

Thus, the illustrative embodiments provide mechanisms for using image recognition through a multi-touch device to program and/or control external electronic devices. Characteristics identified may include an area value, geometric shape(s), identification information, gestures, an image, or the like. Using the characteristics, the object may be identified and a function may be performed on an external electronic device based on the identified object and/or gesture.

Figure 4:
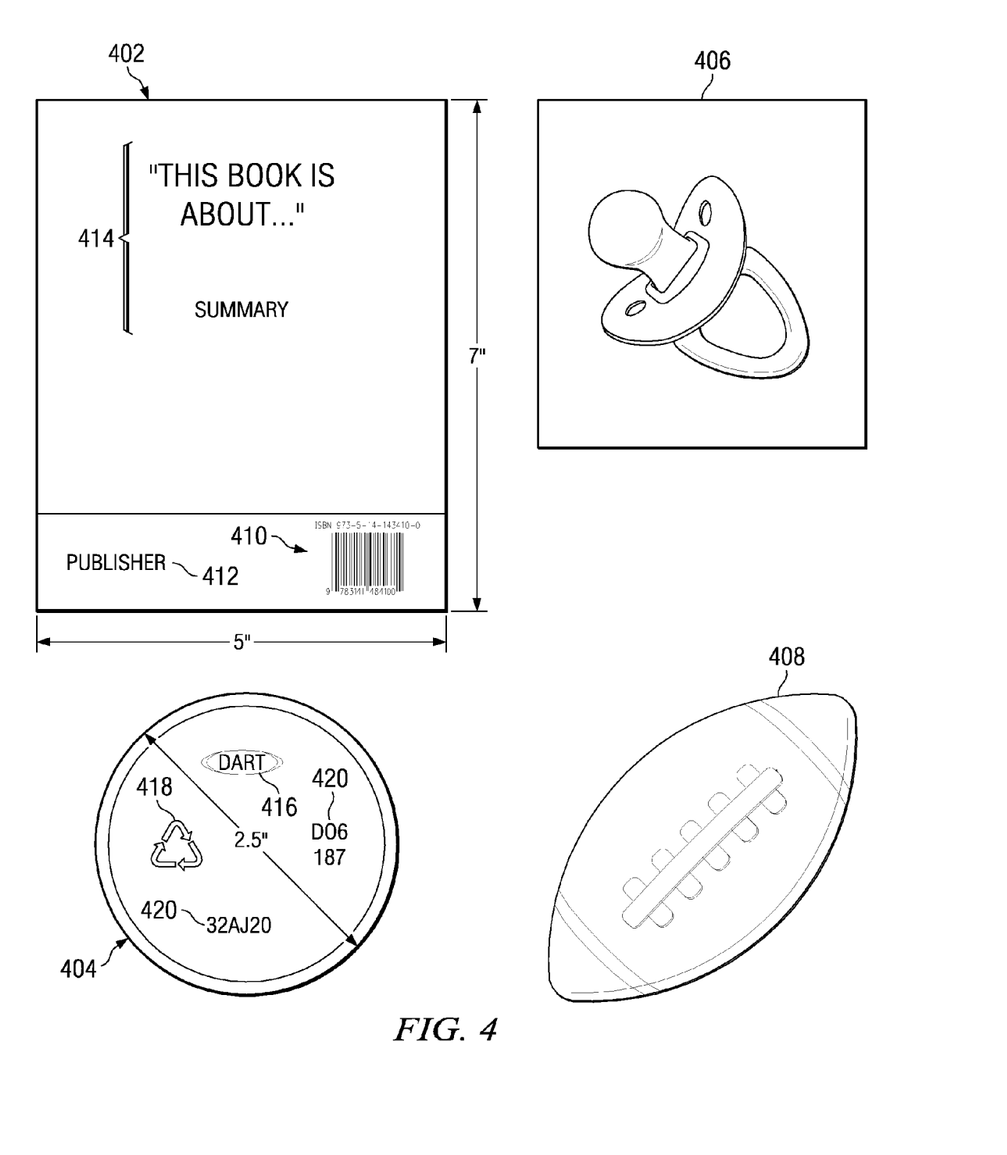
FIG. 4 depicts some exemplary objects that may be identified using an presence identification application in accordance with an illustrative embodiment.

FIG. 4 depicts exemplary object and gesture images that may be identified using a presence identification application in accordance with an illustrative embodiment. As each of objects 402-406 and gesture 408 are placed on a multi-touch device, such as multi-touch device 310 of FIG. 3, a presence identification application, such as presence identification application 302 of FIG. 3, may identify characteristics associated with each of objects 402-406 and gesture 408. For object 402, an area calculator may determine a geometric shape of a rectangle and an area of 5×7=35 inches, for example, and an optical character recognition (OCR) module may identify barcode 410, publisher 412, and additional text 414. Using these characteristics, the presence identification application may identify the object as a book using the above described successive limitation of objects in a characteristics data structure. Then, an identification module may turn off any associated external electronic devices.

For object 404, the area calculator may determine a geometric shape of a circle and an area of (2.5/2)×3.14=3.925 inches, for example, and the OCR module may identify manufacturer 416, recycle image 418, and model numbers 420. Using these characteristics, the presence identification application may identify the object as a polystyrene cup with a cold liquid using the above described successive limitation of objects in a characteristics data structure. Then, an identification module may display an afternoon movie listing.

For object 406, the area calculator and the optical character recognition (OCR) module may fail to identify any characteristics. However, merely using the image, the presence identification application may identify the object as a pacifier using the above described characteristics data structure. Then, an identification module may turn on baby music of baby television programming, such as "BabyFirstTV™."

For image 408, the area calculator and the optical character recognition (OCR) module may again fail to identify any characteristics. However, merely using the image, the presence identification application may identify the object as a football using the above described characteristics data structure. Then, an identification module may provide a listing of all football games that are on or upcoming.

Thus, the illustrative embodiments provide mechanisms for identifying objects that are placed and gestures that are drawn or written on a multi-touch device by using sensors that identify characteristics, such as an area value, geometric shape(s), identification information, an image, or the like, that are associated with the object and/or gesture.

Figure 5A:
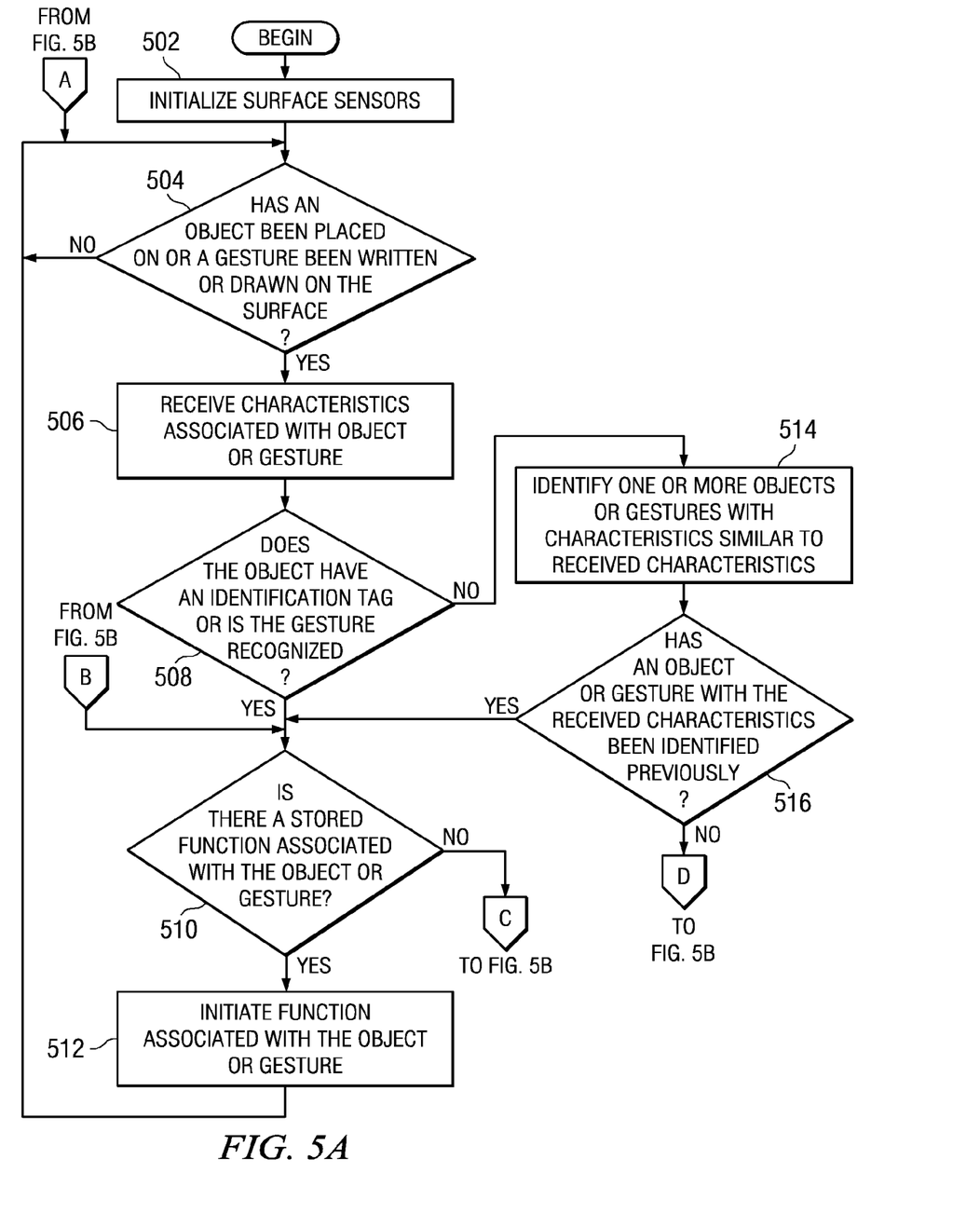
FIGS. 5A and 5B depict an exemplary initial operation of the presence identification application in accordance with an illustrative embodiment.
Figure 5B:
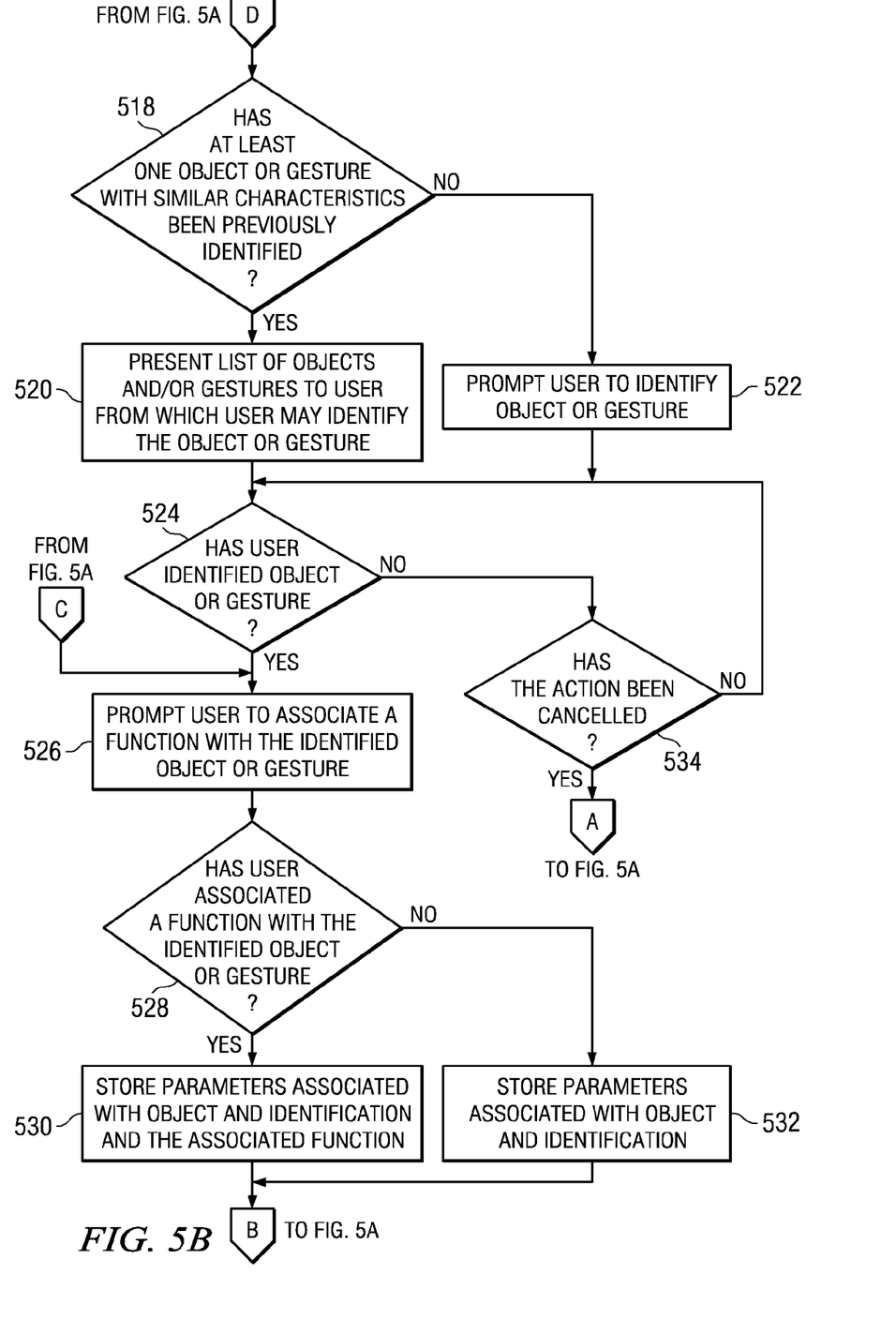

FIGS. 5A and 5B depict an exemplary initial operation of the presence identification application in accordance with an illustrative embodiment. As the operation begins, the presence identification application is initialized, which includes initializing all of the sensors associated with the multi-touch device (step 502). At this point all of the sensors associated with the multi-touch device make initialization images which are used in making determination as objects are placed on or gestures written on the multi-touch device associated with the presence identification application. Using the sensors associated with the multi-touch device, presence identification application is able to determine if an object has been placed on or an image written on the multi-touch device (step 504).

If at step 504 an object has not been placed on or a gesture written on the multi-touch device, then the operation returns to step 504. If at step 504 an object has been placed on or a gesture written/drawn on the multi-touch device, then a presence identification application receives characteristics associated with the object and/or gesture (step 506). The characteristics may be one or more of an area value, geometric shape(s), characteristic markings, an image, or the like. The identification module determines if the object has an identification tag or is the gesture recognized, such as a barcode (step 508). If at step 508 an identification tag has been identified or the gesture is recognized, the identification module determines if there is a function in a data structure that is associated with the identified object or gesture (step 510). If at step 510 a function exists in the data structure that is associated with the object or gesture, then the identification module initiates the function with an external electronic device (step 512), with the operation returning to step 504 thereafter. The associated function may be volume up/down, mute, channel up/down, display guide, display limited guide, or the like. If at step 510 a function fails to exist in the data structure that is associated with the object or gesture, then the operation proceeds to step 526.

If at step 508 an identification tag is not identified or the gesture is not recognized, the identification module may use all or a portion of the received characteristics to identify the object or gesture based on similar characteristics for objects and gestures stored in a characteristics data structure (step 514). The identification module determines if an object or gesture with the received characteristics has been previously identified (step 516). The identification module searches the characteristics associated with objects and gestures in characteristics data structure using the characteristic information received from an receiving module, an area calculator, and/or an OCR module, in order to identify the object or gesture.

If at step 516 the identification module identifies an object or gesture that exactly matches the received characteristics or if the characteristics are met within some predetermined tolerance, then the operation proceeds to step 510. If at step 516 the identification module fails to identify an object or gesture that exactly matches in compared characteristics or if the characteristics are not met within some predetermined tolerance, then the identification module determines if at least one object or gesture with similar characteristics has been identified previously (step 518). If at step 518 the identification module is able to identify at least one object or gesture, then the identification module prompts the user with a list of the identified objects and/or gestures so that the user may identify the object or gesture (step 520). If at step 518 the identification module is unable to identify at least one object or gesture, then the identification module prompts the user to identify the object or gesture (step 522).

From step 520 or 522, the identification module determines if the user has identified the object or gesture (step 524). If at step 524 the user has identified the object or gesture or from step 510 if a function fails to exist in the data structure that is associated with the object or gesture, then the identification module prompts the user to associate a function with the identified object or gesture (step 526) and then determines if the user has selected a function for the identified object or gesture (step 528). If at step 528 the user selects a function to associate with the identified object or gesture, then the identification module stores parameters including the image identification along with the characteristics of the object or gesture and the associated function in the characteristics data structure (step 530), with the operation proceeding to step 510 thereafter.

If at step 528 the user fails to select a function to associate with the identified object or gesture, then the identification module stores parameters including the image identification along with the characteristics of the object or gesture in the characteristics data structure (step 532), with the operation proceeding to step 510 thereafter. If at step 524 the user fails to identify the object or gesture, then the identification module determines if the prompt to the user has been canceled (step 534). If at step 534 the prompt has not been canceled, then the operation returns to step 524. If at step 534 the prompt has been canceled, then the operation returns to step 504.

Thus, the illustrative embodiments provide mechanisms for controlling various external electronic devices by using gesture recognition or by identifying objects with or without an identification tag that are placed on a multi-touch device. Using identifying gestures and/or characteristics of objects, such as geometric shape, characteristic markings, or the like, the gesture and/or object may be directly or indirectly identified. Once gestures and/or objects are identified, an external audio, video, or combination of audio and video electronic devices may be controlled.

As noted above, it should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for gesture recognition through a multi-touch device to control external electronic devices, the method comprising:

receiving an indication of the presence of a gesture and at least one object on a clear surface of the multi-touch device via a plurality of sensors located beneath the clear surface;

identifying a first plurality of characteristics associated with the gesture;

identifying a second plurality of characteristics associated with the at least one object;

using the first plurality of characteristics, searching a data structure to determine the existence of a single gesture with characteristics that matches the first plurality of characteristics of the single gesture, wherein the data structure is searched to determine the existence of the single gesture based on the second plurality of characteristics associated with the at least one object;

responsive to a match of characteristics of the single gesture based on the second plurality of characteristics associated with the at least one object, determining whether the single gesture has an associated function; and responsive to an existence of the associated function, executing the associated function on one of a plurality of external electronic devices.

2. The method of claim 1, further comprising:

responsive to a failure to identify the single gesture based on the second plurality of characteristics associated with the at least one object, searching the data structure to determine the existence of one or more objects or gestures with characteristics within a tolerance of the first and the second plurality of characteristics;

responsive to identifying the one or more objects or gestures, prompting the user via the clear surface on which the gesture and the at least one object are present to identify the single gesture from a list of the one or more gestures;

responsive to the user identifying the single gesture, determining whether the single gesture has an associated function; and responsive to the existence of the associated function, executing the associated function on one of the plurality of external electronic devices.

3. The method of claim 2, further comprising:

responsive to a failure to identify the one or more objects or gestures based on the second plurality of characteristics associated with the at least one object, prompting the user via the clear surface on which the gesture and the at least one object are present to identify the single gesture;

responsive to the user identifying the single gesture, determining whether the single gesture has an associated function; and responsive to the existence of the associated function, executing the associated function on one of the plurality of external electronic devices.

4. The method of claim 3, further comprising:

storing the identification of the single gesture and the first plurality of characteristics in the data structure.

5. The method of claim 1, wherein the associated function is at least one of a volume up, volume down, mute, channel up, channel down, display guide, or display limited guide.

6. The method of claim 1, wherein the first and the second plurality of characteristics comprise at least one of area, geometric shape, gesture, or characteristic markings.

7. The method of claim 1, wherein the first and the second plurality of characteristics comprise at least two from the set of area, geometric shape, gesture, and characteristic markings.

8. A computer program product comprising a non-transitory computer recordable medium having a computer readable program recorded thereon, wherein the computer readable program, when executed on a computing device, causes the computing device to:

receive an indication of the presence of a gesture and at least one object on a clear surface of a multi-touch device via a plurality of sensors located beneath the clear surface;

identify a first plurality of characteristics associated with the gesture;

identify a second plurality of characteristics associated with the at least one object;

using the first plurality of characteristics, search a data structure to determine the existence of single gesture with characteristics that matches the first plurality of characteristics of the single gesture, wherein the data structure is searched to determine the existence of the single gesture based on the second plurality of characteristics associated with the at least one object;

responsive to a match of characteristics of the single gesture based on the second plurality of characteristics associated with the at least one object, determine whether the single gesture has an associated function; and responsive to an existence of the associated function, execute the associated function on one of a plurality of external electronic devices.

9. The computer program product of claim 8, wherein the computer readable program further causes the computing device to:

responsive to a failure to identify the single gesture based on the second plurality of characteristics associated with the at least one object, search the data structure to determine the existence of one or more objects or gestures with characteristics within a tolerance of the first and the second plurality of characteristics;

responsive to identifying the one or more objects or gestures, prompt the user via the clear surface on which the gesture and the at least one object are present to identify the single gesture from a list of the one or more gestures;

responsive to the user identifying the single gesture, determine whether the single gesture has an associated function; and responsive to the existence of the associated function, execute the associated function on one of the plurality of external electronic devices.

10. The computer program product of claim 9, wherein the computer readable program further causes the computing device to:

responsive to a failure to identify the one or more objects or gestures based on the second plurality of characteristics associated with the at least one object, prompt the user via the clear surface on which the gesture and the at least one object present to identify the single gesture;

responsive to the user identifying the single gesture, determine whether the single gesture has an associated function; and responsive to the existence of the associated function, execute the associated function on one of the plurality of external electronic devices.

11. The computer program product of claim 10, wherein the computer readable program further causes the computing device to:

store the identification of the single gesture and the first plurality of characteristics in the data structure.

12. The computer program product of claim 8, wherein the associated function is at least one of a volume up, volume down, mute, channel up, channel down, display guide, or display limited guide.

13. An apparatus, comprising:

a processor; and a memory coupled to the processor, wherein the memory comprises instructions which, when executed by the processor, cause the processor to:

receive an indication of the presence of a gesture and at least one object on a clear surface of a multi-touch device via a plurality of sensors located beneath the clear surface;

identify a first plurality of characteristics associated with the gesture;

identify a second plurality of characteristics associated with the at least one object;

using the first plurality of characteristics, search a data structure to determine the existence of a single gesture with characteristics that matches the first plurality of characteristics of the single gesture, wherein the data structure is searched to determine the existence of the single gesture based on the second plurality of characteristics associated with the at least one object;

responsive to a match of characteristics of the single gesture based on the second plurality of characteristics associated with the at least one object, determine whether the single gesture has an associated function; and responsive to an existence of the associated function, execute the associated function on one of a plurality of external electronic devices.

14. The apparatus of claim 13, wherein the instructions further cause the processor to:

responsive to a failure to identify the single gesture based on the second plurality of characteristics associated with the at least one object, search the data structure to determine the existence of one or more objects or gestures with characteristics within a tolerance of the first and the second plurality of characteristics;

responsive to identifying the one or more objects or gestures, prompt the user via the clear surface on which the gesture and the at least one object are present to identify the single gesture from a list of the one or more gestures;

responsive to the user identifying the single gesture, determine whether the single gesture has an associated function; and responsive to the existence of the associated function, execute the associated function on one of the plurality of external electronic devices.

15. The apparatus of claim 14, wherein the instructions further cause the processor to:

responsive to a failure to identify the one or more objects or gestures based on the second plurality of characteristics associated with the at least one object, prompt the user via the clear surface on which the gesture and the at least one object are present to identify the single gesture;

responsive to the user identifying the single gesture, determine whether the single gesture has an associated function; and responsive to the existence of the associated function, execute the associated function on one of the plurality of external electronic devices.

16. The apparatus of claim 15, wherein the instructions further cause the processor to:

store the identification of the single gesture and the first plurality of characteristics in the data structure.

17. The apparatus of claim 13, wherein the associated function is at least one of a volume up, volume down, mute, channel up, channel down, display guide, or display limited guide.

* * * * *